United States Patent [19]

Lim et al.

[11] Patent Number: 5,290,628
[45] Date of Patent: Mar. 1, 1994

[54] HYDROENTANGLED FLASH SPUN WEBS HAVING CONTROLLABLE BULK AND PERMEABILITY

[75] Inventors: Hyun S. Lim, Chesterfield, Va.; Robert H. Peterson, Hendersonville, Tenn.; Roger K. Siemionko, Hockessin, Del.; James R. Vincent, Old Hickory, Tenn.

[73] Assignee: E. I. Du Pont de Nemours and Company, Wilmington, Del.

[21] Appl. No.: 49,641

[22] Filed: Apr. 21, 1993

Related U.S. Application Data

[63] Continuation of Ser. No. 973,876, Nov. 10, 1992, abandoned.

[51] Int. Cl.⁵ .................................................. B32B 5/06
[52] U.S. Cl. ................................. 428/299; 2/272; 28/104; 28/105; 55/DIG. 2; 428/137; 428/284; 428/286; 428/287; 428/296; 428/297; 428/298; 428/326; 428/910
[58] Field of Search ............... 28/104, 105; 428/131, 428/284, 286, 287, 297, 298, 296, 910, 326, 137; 2/272; 55/DIG. 2

[56] References Cited

U.S. PATENT DOCUMENTS

| | | | |
|---|---|---|---|
| 3,169,899 | 2/1965 | Steuber | 161/72 |
| 3,403,862 | 10/1968 | Dworjanyn | 239/566 |
| 3,485,706 | 12/1969 | Evans | 161/72 |
| 3,600,483 | 8/1971 | Davis et al. | 264/53 |
| 4,514,455 | 4/1985 | Hwang | 428/198 |
| 4,681,801 | 7/1987 | Elan et al. | 428/283 |
| 4,775,579 | 10/1988 | Hagy et al. | 428/284 |
| 4,883,709 | 11/1989 | Nozaki et al. | 428/299 |
| 4,988,560 | 1/1991 | Meyer et al. | 428/297 |
| 5,013,599 | 5/1991 | Guckert et al. | 428/298 |
| 5,023,130 | 6/1991 | Simpson et al. | 428/227 |
| 5,047,121 | 9/1991 | Kochar | 162/146 |
| 5,144,729 | 9/1992 | Austin et al. | 28/105 |
| 5,150,660 | 9/1992 | Kuczynski | 428/298 |
| 5,151,320 | 9/1992 | Homonoff et al. | 428/298 |

FOREIGN PATENT DOCUMENTS

0333211 9/1989 European Pat. Off. .

OTHER PUBLICATIONS

"Protective Apparel of DuPont 'Tyvek'-Safety You Can Wear", E-02145 (1987).

Primary Examiner—James J. Bell

[57] ABSTRACT

A process for hydraulically needling a web of staple fibers into an unbonded flash spun web made of continuous plexifilaments to form a spunlaced nonwoven fabric. The web of staple fibers is positioned against the unbonded flash spun web and then hydraulically needled such that the staple fibers are embedded into and entangled with the unbonded flash spun web to form a spunlaced nonwoven fabric. Optionally, the spunlaced nonwoven fabric can be thermally bonded to maintain or increase the permeability of the fabric. Thermal bonding can be used to control the level of permeability depending on the end-use desired. Spunlaced nonwoven fabrics made by the inventive process are particularly useful in filtration applications (e.g., vacuum cleaner bags) when thermal bonding is employed and as bulky, downproof and featherproof barrier liners for garments, sleeping bags, pillows, comforters and the like when thermal bonding is not employed.

16 Claims, 3 Drawing Sheets

HYDROENTANGLED FLASH SPUN WEBS HAVING CONTROLLABLE BULK AND PERMEABILITY

This is a continuation of application Ser. No. 07/973,876 filed Nov. 10, 1992, now abandoned.

FIELD OF THE INVENTION

The present invention relates to a process for hydroentangling a web of staple fibers with an unbonded flash spun web made of continuous plexifilaments to form a composite nonwoven fabric. In particular, the present invention relates to hydraulically needling staple fibers into an unbonded flash spun nonwoven web such that the staple fibers are embedded into and entangled with the unbonded flash spun nonwoven web.

BACKGROUND OF THE INVENTION

Spunbonded sheets of flash-spun polyolefin plexifilamentary film-fibril strands have been used in the past as disposable industrial garments. Such sheets have been made commercially by E.I. du Pont de Nemours & Company and sold under the trademark "TYVEK" spunbonded olefin. The sheets are known for their strength, durability, opacity and ability to act as a barrier to particulate matter that is sub-micron in size. Because of these desirable characteristics, the spunbonded sheets have been fashioned into many types of industrial garments, such as those worn by asbestos workers and disclosed in "Protective Apparel of Du Pont "TYVEK"—SAFETY YOU CAN WEAR", E-02145, (1987).

Although these sheets are useful in garment and apparel applications, there has been a need to add bulkiness and permeability to the sheets so that they are also useful in other specific end-use applications (e.g., as microfiltration fabrics). Although unconsolidated flash spun sheets have fairly high permeability in the unfused state, it is lost when the sheet is thermally bonded since fusing reduces permeability to a level that is unsuitable for sensitive filtration applications (e.g., vacuum cleaner bags). This is attributed to high mechanical consolidation of the microdenier, ribbon-like, high surface area fibers produced by the flash spinning process. Because of the limited ability of the flash spinning and thermal bonding process to increase permeability beyond a Gurley-Hill porosity of about 8 second/100 cc, there is a significant need for a method to be developed which will increase or even maintain the permeability to a Frazier porosity of at least 4 $ft^3/ft^2/min$ following thermal bonding.

Various methods have been suggested in the past for providing filtration media from sheets made of flash spun plexifilaments. An example of such filtration media is commercially available from E.I. du Pont de Nemours and Company under the trademark "HYSURF" filter media. However, these methods (e.g., U.S. Pat. No. 5,047,121 (Kochar)) require numerous process steps and equipment for cutting up and refining the flash spun sheets into pulp suitable for wet-laying on continuous papermaking machines. Only if these steps are carefully followed will subsequent thermal bonding produce a high grade paper suitable for microfiltration applications (e.g., vacuum cleaner bags).

In addition, in U.S. Pat. No. 5,023,130 (Simpson et al.) hydroentangled flash spun polyolefin webs are disclosed having enhanced softness and barrier properties. Spunlaced fabrics made according to the Simpson et al. process are commercially available from E.I. du Pont de Nemours and Company under the trademarks "TYPRO HC" and "ComforMax IB". These spunlaced fabrics have proven useful as inner-layer barrier liners for garments, sleeping bags, comforters and pillows. However, although these spunlaced fabrics work well with fiber insulating or filling materials, they do not work well in preventing perculation when duck feathers or down filling are used. Experience has shown that feather quills migrate through available openings in the fabric.

Moreover, in U.S. Pat. No. 4,681,801 (Eian et al.) melt-blown fiber webs are hydroentangled to force reinforcing fibers therethrough. The reinforcing fibers are hydraulically needled, preferably mechanically needled, through the melt-blown fibers and then bonded to fibers on the opposing faces of the layer of melt-blown fibers to hold the reinforcing fibers in position.

Clearly, what is needed is a process and spunlaced nonwoven fabric which do not have the deficiencies inherent in the prior art. In particular, in the unfused state, the spunlaced fabric should have bulk and should prevent perculation of feathers or down filling when used as a barrier liner in garments, pillows or the like. In addition, in the thermally bonded state, the spunlaced fabric should provide an increased level of permeability such that it is useful in sensitive microfiltration applications. Other objects and advantages of the present invention will become apparent to those skilled in the art upon reference to the attached drawings and to the detailed description of the invention which hereinafter follows.

SUMMARY OF THE INVENTION

In one aspect of the invention, there is provided a process for making a spunlaced nonwoven fabric comprising the steps of:

(a) positioning a web of staple fibers against an unbonded flash spun web on a supporting screen to form a composite structure; and (b) hydraulically needling the staple fiber side of the supported composite structure such that the staple fibers penetrate the unbonded flash spun web and are embedded into and entangled with the unbonded flash spun web.

This process produces unfused, spunlaced nonwoven fabrics having a Frazier porosity of at least 4 $ft^3/ft^2/min$. These unfused spunlaced fabrics are particularly well suited as inner-layer barrier fabrics such as liners for pillows, sleeping bags, comforters and disposable industrial garments (e.g., protective and medical barrier apparel). Because the pores of the unbonded flash spun web have been sufficiently closed by the penetration of stiff staple fibers into the unbonded flash spun web structure, feathers and down filling cannot perculate through the fabric itself (i.e., the fabric is downproof and featherproof). Presently, this advantage is only possible when expensive, tightly woven fabrics are used.

In another aspect of the invention, the process further comprises the step of thermally bonding (i.e., fusing) the hydraulically needled fabric of step (b) to maintain or increase the permeability of the resultant fabric depending on the end-use desired. This process surprisingly produces thermally bonded, spunlaced nonwoven fabrics that have a Frazier porosity of at least 4 $ft^3/ft^2/min$, preferably 10–40 $ft^3/ft^2/min$, most preferably 10–20

$ft^3/ft^2/min$. In the prior art, thermal bonding causes spunlaced flash spun webs to suffer a significant decrease in permeability. Because the permeability of the spunlaced fabric can be increased after thermal bonding, the resulting thermally bonded spunlaced fabrics have adequate permeability for many sensitive microfiltration applications (e.g., vacuum cleaner bags) which were not possible in the past. These thermally bonded spunlaced fabrics are also believed to be useful as reinforcement construction materials. The reason for the increase in permeability is believed to be that the stiff staple fibers that are embedded into the unbonded flash spun web of step (b) reduce mechanical consolidation and that the flash spun fibers shrink causing permeability to increase directly with the thermal bonding temperature.

A further advantage of the thermally bonded, spunlaced nonwoven fabric is that the side of the fabric from which the staple fibers penetrate the unbonded flash spun web provide a gradient, depth-type filter that prevents blinding of the microfiber portion of the fabric when in use.

BRIEF DESCRIPTION OF THE DRAWINGS

The invention will be better understood with reference to the following figures.

DETAILED DESCRIPTION OF THE PREFERRED EMBODIMENTS

Figure 1:
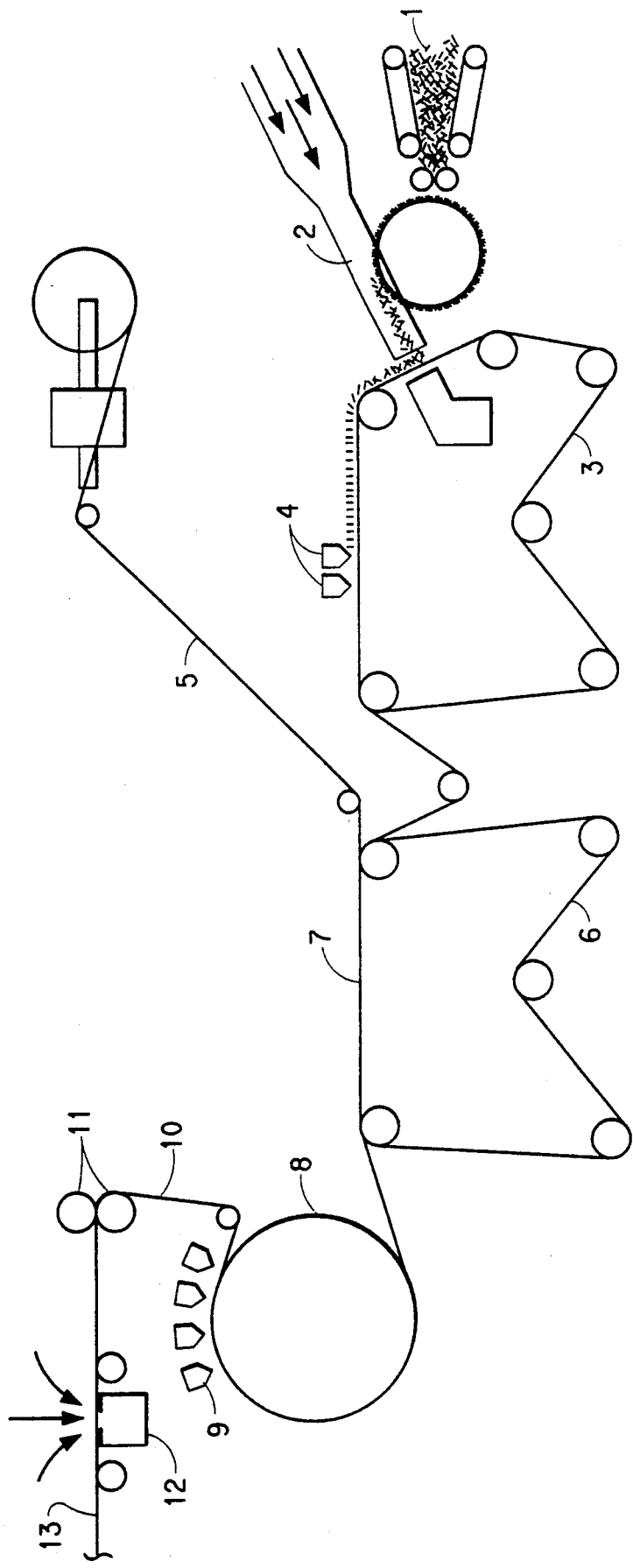
FIG. 1 is a schematic side view of an apparatus for continuously forming a composite web structure from staple fibers and an unbonded flash spun web and hydraulically needling the composite web structure to form spunlaced nonwoven fabrics in accordance with the invention.
Figure 1:
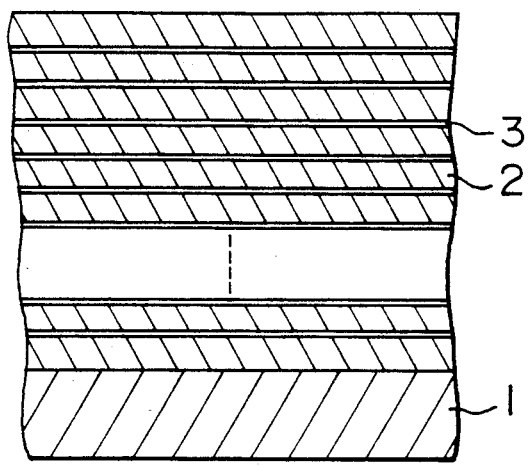

One of the starting materials for the process of the present invention is a lightly consolidated or unconsolidated flash-spun polyolefin, preferably polyethylene or polypropylene, plexifilamentary film-fibril web produced by the general procedure of Steuber, U.S. Pat. No. 3,169,899, the entire contents of which are incorporated herein by reference. According to the preferred method for making the starting sheets, a linear polyethylene having a density of 0.96 $g/cm^3$, a melt index of 0.9 (determined by ASTM method D-1238-57T, condition E) and a 135 C upper limit of its melting temperature range is flash spun from a 12 weight percent solution of the polyethylene in trichlorofluoromethane. The solution is continuously pumped to spinneret assemblies at a temperature of about 179 C and a pressure above about 85 atmospheres. The solution is passed in each spinneret assembly through a first orifice to a pressure let-down zone and then through a second orifice into the surrounding atmosphere. The resulting film fibril strand (i.e., plexifilament) is spread and oscillated by means of a shaped rotating baffle, electrostatically charged, and then is deposited on a moving collection belt. The spinnerets are spaced to provide overlapping, intersecting deposits on the belt to form a wide, flash spun nonwoven web. The web may then be lightly consolidated by passage through a nip that applies a load of about 1.8 kilograms per cm of web width or it may remain unconsolidated. Generally, webs having a basis weight in the range of 1.0 to 3.5 $oz/yd^2$ are suitable for use in the process of the present invention. Also, webs having a strand diameter of between 1-10 microns are preferred. The web is not thermally bonded or fused (i.e., unbonded) prior to hydraulic needling treatment, the description of which follows hereinafter.

The other starting material is a web of staple fibers. The web may be prepared according to the teachings of U.S. Pat. No. 3,485,706 (Evans), the entire contents of which are incorporated herein by reference. Preferably, the web of staple fibers should be carded or air-laid such that it can easily be positioned against the unbonded flash spun web and supported on a screen (e.g., a 75 mesh screen).

As used herein, "staple fibers" means any relatively stiff staple length fiber that is typically used in the art of hydraulic needling. The fiber must have adequate modulus (i.e., not too high and not too low) to be embedded and entangled with the unbonded flash spun web. The staple fibers can be made of synthetic or natural fibers or blends of both. They may be single component as well as bicomponent staple fibers. Non-limiting examples of suitable staple fibers include those made of woodpulp, polyester, nylon, acrylics and aramids such as "KEVLAR" and "NOMEX".

As used herein, the terms "unfused" or "unbonded" mean that the web or fabric has not been thermally bonded or thermally fused. This is to be distinguished from mechanical bonding (e.g., hydraulic needling or light consolidation).

In use, the web of staple fibers is positioned against an unbonded flash spun web on a supporting screen to form a composite web structure. The basis weight ratio of the staple fiber web to the unbonded flash spun web can be varied depending on the end-use desired. For example, if increased bulkiness is desired, increased amounts of staple fibers are used. The supported composite web structure is then passed under a series of high pressure water jets (preferably from 200 to 3,000 psi jet pressure) such that the staple fibers are forced (i.e., hydraulically needled) into the unbonded flash spun web. The staple fibers penetrate the flash spun web such that they embed and entangle with the flash spun web and form a spunlaced nonwoven fabric. Methods and equipment suitable for hydraulically needling the composite web structure are disclosed in more detail in the Evans patent and in U.S. Pat. No. 3,403,862 (Dworjanyn). Typically, after the composite web structure is hydraulically needled into a spunlaced nonwoven fabric excess water is removed by vacuum dewatering and/or by squeeze rolls. (Squeeze rolling is a compaction force which causes the spunlaced nonwoven fabric to decrease in permeability). Drying is then performed at a temperature which doesn't cause thermal bonding (i.e., fusing) of the fabric to take place.

Following hydraulic needling, the unbonded, spunlaced nonwoven fabric has added thickness and a Frazier porosity of at least 4 $ft^3/ft^2/min$. The fabric is useful as a bulky, inner-layer barrier fabric for garments, sleeping bags, pillows, comforters and the like. It is also useful as a medical barrier fabric and as a protective apparel. Because the pores of the unbonded flash spun web have been sufficiently blocked by the stiff staple fibers (i.e., increased barrier properties), the resulting spunlaced nonwoven fabric has surprisingly proven to prevent perculation when used with down filling or natural feathers (i.e., quills are prevented from migrating through the fabric).

Optionally, if sensitive filtration or other applications are desired, the spunlaced nonwoven fabric may be thermally bonded. In the past, thermal bonding always caused the permeability of a flash spun web to significantly decrease, just the opposite of what is wanted for microfiltration end-uses. However, to the applicants surprise, thermal bonding actually allows the permeability to be maintained and more importantly increased. In fact, depending on the level of thermal bonding used, the permeability of the spunlaced nonwoven fabric can be tailored for the desired end-use (this is typically between about 10 and 40 ft$^3$/ft$^2$/min.). This phenomenon is believed to be caused by fiber shrinkage of the flash spun web and because the staple fibers reduce compaction of the flash spun fibers onto themselves during thermal bonding. (Thermal bonding allows fiber shrinkage forces to dominate compaction forces (e.g., squeeze roller compaction)). As a result, the greater the thermal bonding level (i.e., higher the thermal bonding temperature and/or pressure) the greater the permeability is increased. If too low a thermal bonding temperature/pressure is used (i.e., below about 135 C and 48 psi), the permeability will actually be decreased since the compaction forces are greater than resulting fiber shrinkage. Because permeability can be controlled, the resulting thermally bonded, spunlaced nonwoven fabrics typically have a lower pressure drop than synthetic fabrics made on conventional wet-lay papermaking machines (e.g., the high grade polyethylene paper of U.S. Pat. No. 5,047,121 (Kochar)).

It has also been found that varying the amount of water jet energy applied during hydraulic needling treatment will affect the depth of staple fiber penetration into the unbonded flash spun web and ultimately the ability of the spunlaced nonwoven fabric's permeability to be increased after thermal bonding. Although even a slight degree of staple fiber penetration will prevent quills from perculating through the resulting unbonded, spunlaced nonwoven fabric when used in barrier liner applications, the depth of penetration is important for high permeability filtration applications. It has been determined that slight penetration of the staple fibers will allow the permeability to be increased only slightly after thermal bonding. However, very deep penetration of the staple fibers will allow permeability to be increased to a large extent after thermal bonding. Therefore, in addition to the thermal bonding level used, the amount of water jet energy employed during hydraulic needling can be varied (see FIGS. 1 and 2 below) to tailor the ultimate permeability of the thermally bonded, spunlaced nonwoven fabric.

Figure 2:
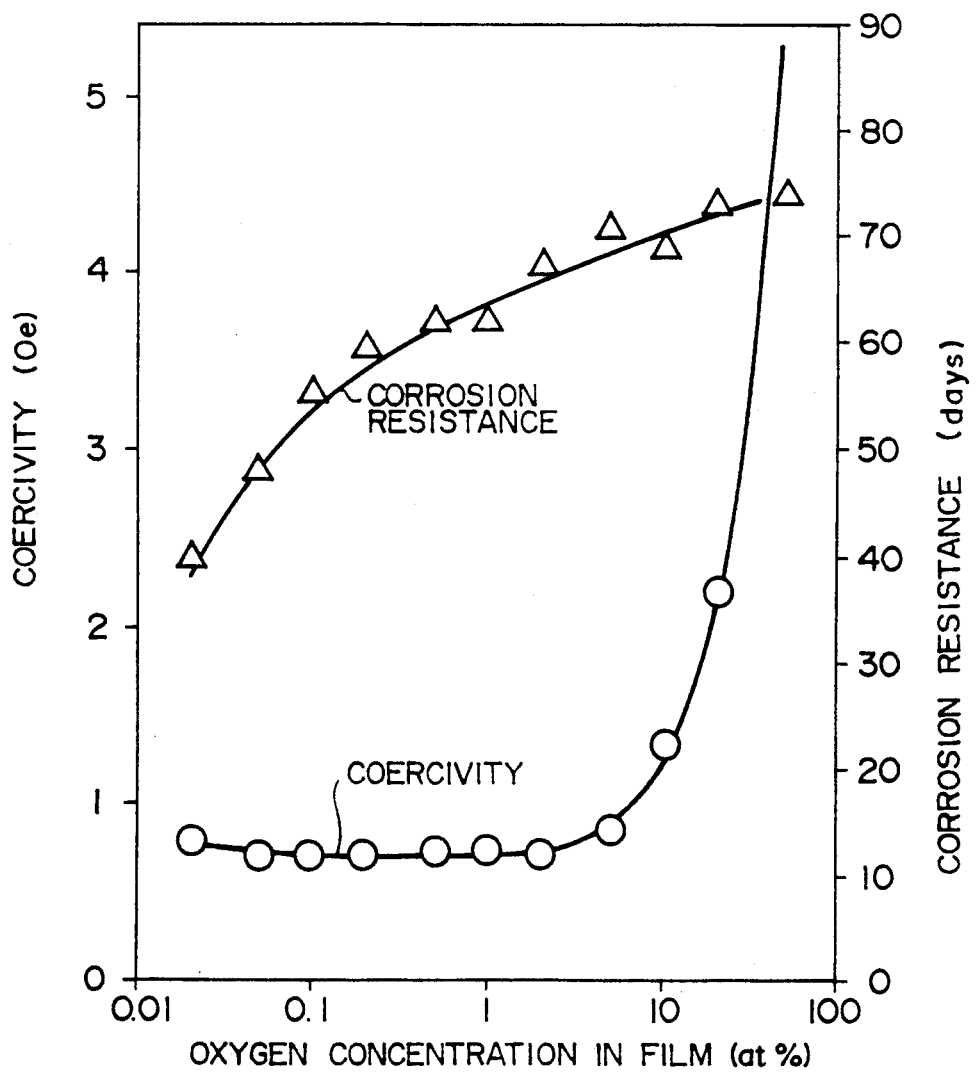
FIG. 2 is a modified version of FIG. 1 showing belt water jets in addition to drum water jets.
Figure 3:
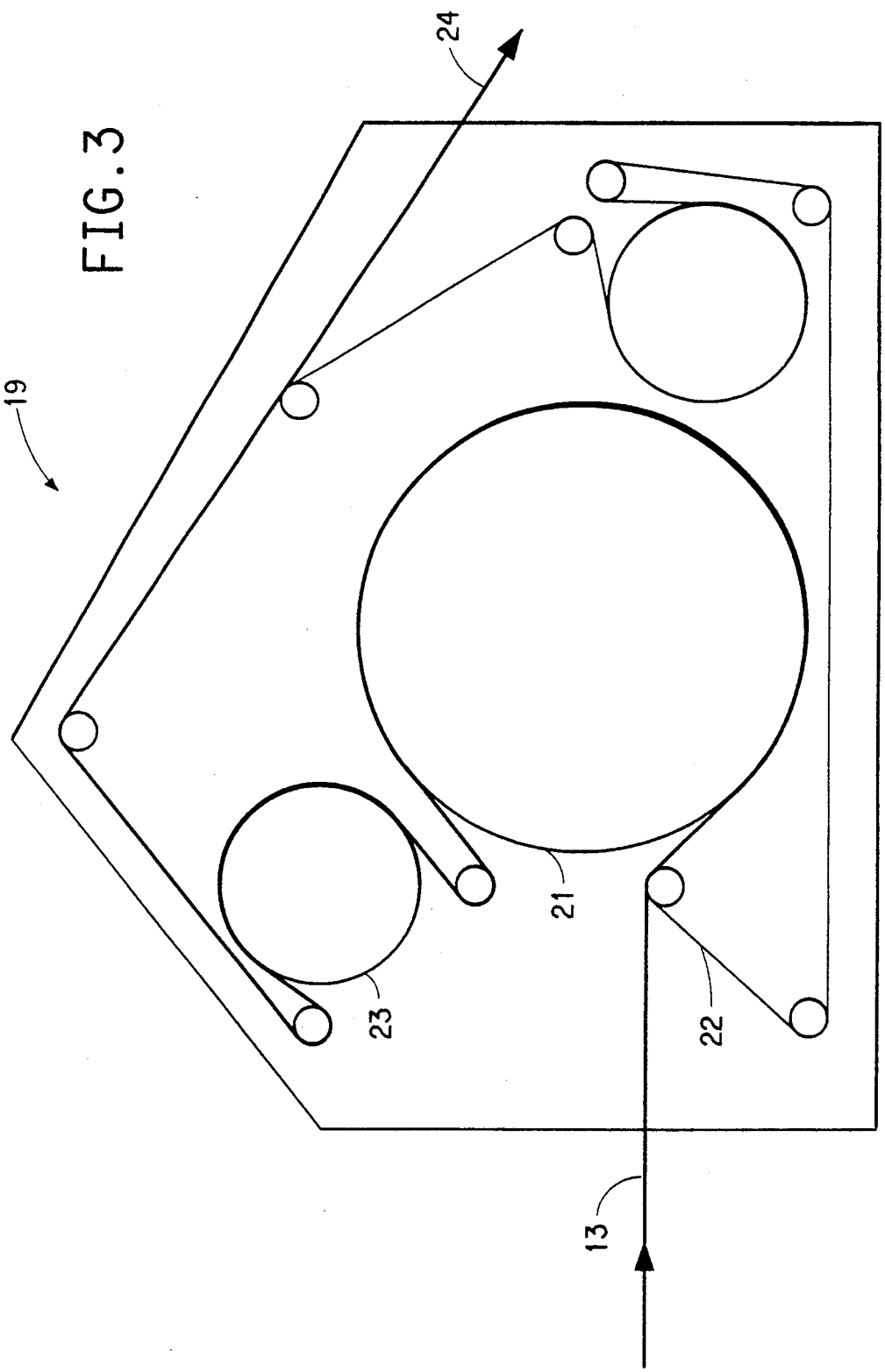
FIG. 3 is a schematic view of a palmer bonder used to optionally thermally bond the spunlaced nonwoven fabric of FIGS. 1 or 2.

Referring now to the figures, schematic diagrams are shown to illustrate typical hydraulic needling methods and equipment (FIGS. 1 and 2) as well as suitable thermal bonding equipment (FIG. 3).

FIG. 1 illustrates an apparatus for continuous processing of the staple fiber web/unbonded flash spun web composite structure to convert it into a spunlaced nonwoven fabric. In particular, staple fibers 1 are doffed in an air stream 2 onto a conveyor 3 where it is lightly needled by a few consolidating water jets 4 to tack it down. The staple fiber web is then positioned against an unbonded flash spun web 5 on conveyor 6 to form a composite web structure 7. The composite web structure is then drawn around drum washer 8 where a series of drum water jets 9 hydraulically needle the staple fiber web into the unbonded flash spun web such that the staple fibers are embedded into and entangled with the unbonded flash spun web to form a spunlaced nonwoven fabric 10. Thereafter, excess water is removed from the spunlaced nonwoven fabric by squeeze rolls 11 and vacuum dewatering equipment 12. The dewatered spunlaced nonwoven fabric 13 is then dried and collected on a wind up roll (not shown) for transporting or storage.

FIG. 2 is the same as FIG. 1 except that a series of water jets 14 are also used to hydraulically needle the unbonded flash spun web side of the composite web structure on conveyor 6. In this manner, both sides of the composite web structure are struck by high pressure water jets during the treatment process.

FIG. 3 illustrates a palmer roll bonder which is optionally used on the unbonded, spunlaced nonwoven fabric 13 of FIGS. 1 or 2. (It will be understood that other bonding techniques or equipment may be appropriately used and that using a palmer roll bonder is not critical to the invention). If the unbonded, spunlaced nonwoven fabric 13 is to be thermally bonded, it is unwound and fed to a palmer bonder 19 where it is wrapped around a 60 inch diameter heated drum 21 by conveyor blanket 22. Conveyor blanket 22 also helps to reduce shrinkage by applying pressure to the fabric as it is thermally bonded. Drum 21 thermally bonds the fabric by being heated to a temperature above the fusing point of the strands making up the flash spun web. Thereafter, the fabric is wrapped around a 24 inch chilled roll 23 to cool the fabric after thermal bonding. This is to prevent fabric shrinkage and edge curling. Thereafter, the thermally bonded, spunlaced nonwoven fabric 24 is collected on a wind up roll (not shown) for transporting or storage.

EXAMPLES

In the non-limiting Examples which follow, the following test methods were employed to determine various reported characteristics and properties. ASTM refers to the American Society of Testing Materials. TAPPI refers to the Technical Association of the Pulp and Paper Industry.

Basis weight was determined by ASTM D-3776-85 and is reported in oz/yd$^2$. Strip tensile strength was determined by ASTM D 1117 and is reported in lbs/linear inch. Frazier porosity was determined by ASTM D737-75 and is reported in ft$^3$/ft$^2$/min. Opacity was determined by TAPPI T-245 M-60 and is reported as a percentage.

Gurley Hill Porosity was determined by ASTM D-726-84 and is reported in second/100 cc.

Pore size was determined using a Coulter Porometer commercially available from Coulter Electronics Limited, Luton Beds., England. The sample to be analyzed was thoroughly wetted so that all accessible pores were completely filled with liquid. The wetted sample was then placed in the sample body of the filter holder assembly, secured with a locking ring and the pore size value was recorded. Values are reported in microns for the maximum, minimum and mean pore size distribution.

Surface Area (SA) was determined by using a Strohlein instrument which measures a 3 gram sample for single point BET nitrogen absorption. It is reported in m$^2$/g.

Mullen Burst was determined by TAPPI T403-85 and is reported in psi.

EXAMPLE 1

In this example, several samples were made by the inventive process using different sets of conditions. In all samples, 2 consolidation jets were used to tack down loose fibers.

In sample 1, a pre-formed scrim of hydroentangled staple fibers was hydraulically needled into an unbonded T-800 "TYVEK" web using only belt washer jets (drum washer jets were turned off). Thus, this sample was prepared without loose staple fibers. The squeeze rolls were left open.

In sample 2, a staple fiber web was hydraulically needled into an unbonded T-800 "TYVEK" web using a series of drum washer jets but no belt washer jets. In this sample, 5 jets (5/20, 5/20, 5/40, 5/40, 5/40 jets) Were used at 2500, 2300, 2000, 2100 and 2000 psi respectively. The squeeze rolls were left open.

In sample 3, the same conditions were followed as in sample 2 except that the squeeze rolls were closed.

In sample 4, the same conditions were followed as in sample 2 except that the type of water jets were altered. In this sample, 6 jets (5/20, 7/10, 5/20, 5/40, 5/40 and 5/40 jets) were used at 2500, 0, 2500, 2450, 2400 and 2500 psi respectively. The squeeze rolls were left open.

In sample 5, the sample conditions were followed as in sample 2 except that the type of water jets were altered. In this sample, 2 jets (5/20 and 5/40 jets) were used at 1200 and 1500 psi respectively. The squeeze rolls were closed.

The samples were tested for various physical properties while unbonded (U) and after thermal bonding (B) at 58 psi at 100 ft/min in a palmer roll bonder.

TABLE 1

| | Sample | | | | | | | | | |
|---|---|---|---|---|---|---|---|---|---|---|
| | U | B | U | B | U | B | U | B | U | B |
| | 1 | | 2 | | 3 | | 4 | | 5 | |
| Basis Weight | 2.6 | 2.8 | 2.8 | 3.2 | 2.7 | 3.0 | 2.6 | 2.8 | 2.3 | 2.5 |
| Thickness (mils) | 18.8 | 13.7 | 20.6 | 13.6 | 12.0 | 12.5 | 19.9 | 13.2 | 10.4 | 11.2 |
| Frazier Porosity | 12.6 | 8.5 | 11.3 | 17.7 | 2.1 | 14.6 | 12.2 | 15.2 | 0.9 | 4.1 |
| Opacity | 95.7 | 76.6 | 93.5 | 85.9 | 93.8 | 75.9 | 92.1 | 80.7 | 96.9 | 78.8 |

Table 1 demonstrates that the Frazier porosity unexpectedly increases during thermal bonding of samples 2–4 where the staple fibers are deeply embedded in the unbonded T-800 "TYVEK" web whereas the pores of the unbonded T-800 "TYVEK" web close up during thermal bonding of sample 1 (i.e., Frazier porosity decreases) where the less mobile fibers of the pre-formed scrim penetrate only the surface layers of the unbonded T-800 "TYVEK" web. Sample 5 demonstrates that Frazier porosity can be controlled (i.e., tailored) by varying the amount of water jet energy during hydraulic needling. In this case, lower water jet energy causes less penetration of staple fibers into the unbonded T-800 "TYVEK" web and a smaller increase in Frazier porosity following thermal bonding.

In addition, sample 3 shows that even if the spunlaced fabric is consolidated (i.e., squeeze rolls closed) such that a low Frazier porosity exists in the unbonded state, the Frazier porosity can still be significantly increased with adequate thermal bonding.

EXAMPLE 2

In this example, the inventive process was followed with the following modifications. Eight (8) spunlaced fabric samples were made from unbonded T-800 "TYVEK" and staple fibers using various staple fiber types and weights. They were as follows:

Sample A = 0.9 oz/yd$^2$ 1.35 dpf polyester fiber/1.56 oz/yd$^2$ T-800 "TYVEK" web Sample B = 0.9 oz/yd$^2$ splittable ribbon X-section acrylic fiber/1.56 oz/yd$^2$ T-800 "TYVEK" web Sample C = 0.85 oz/yd$^2$ splittable polyester fiber/1.56 oz/yd$^2$ T-800 "TYVEK" web Sample D = 0.9 oz/yd$^2$ 2.5 dpf ribbon X-section polyester fiber/1.56 oz/yd$^2$ T-800 "TYVEK" web Sample E = 1.4 oz/yd$^2$ 3 dpf polyester fiber/1.56 oz/yd$^2$ T-800 "TYVEK" web Sample F = 2.2 oz/yd$^2$ 6 dpf bicomponent (side-by-side) polyester fiber/1.56 oz/yd$^2$ T-800 "TYVEK" web Sample G = 2.0 oz/yd$^2$ 1.35 dpf polyester fiber/1.56 oz/yd$^2$ T-800 "TYVEK" web Sample H = 1.0 oz/yd$^2$ wetlaid woodpulp (60 wt. %) and 1.5 dpf polyester (40 wt. %)/1.56 oz/yd$^2$ T-800 "TYVEK" web Samples C & D contain fibers that split during hydroentangling. Denier per filament of the split fibers range from 0.2 to 2.5 dpf.

In Table 2, physical properties are reported for unbonded, spunlaced nonwoven fabrics according to the invention.

TABLE 2

| | Sample | | | | | | | |
|---|---|---|---|---|---|---|---|---|
| | A | B | C | D | E | F | G | H |
| Basis Weight | 2.71 | 2.51 | 4.32 | 2.47 | 2.86 | 3.74 | 3.89 | 2.77 |
| Thickness (mils) | 20.20 | 20.57 | 17.13 | 20.75 | 21.49 | 29.09 | 30.52 | 21.91 |
| Frazier Porosity | 10.93 | 10.09 | 9.54 | 13.98 | 14.63 | 10.12 | 9.85 | 11.35 |
| Opacity | 93.88 | 94.67 | 95.82 | 93.93 | 94.91 | 95.75 | 96.02 | 95.72 |
| Surface Area | 6.79 | 6.90 | 6.34 | 4.94 | — | 4.91 | 4.78 | 6.85 |

Table 3 shows the physical properties of samples A–H after they have been thermally bonded using 58 psi steam at a speed of 100 ft/min (i.e., thermally bonded, spunlaced nonwoven fabrics).

TABLE 3

| | Sample | | | | | | | |
|---|---|---|---|---|---|---|---|---|
| | A | B | C | D | E | F | G | H |
| Basis Weight | 2.80 | 2.48 | 2.26 | 2.66 | 3.05 | 3.90 | 4.19 | 2.72 |
| Thickness (mils) | 16.44 | 14.60 | 12.93 | 15.81 | 19.53 | 22.59 | 23.98 | 23.11 |
| Frazier Porosity | 18.65 | 14.98 | 10.84 | 19.48 | 19.07 | 19.77 | 12.98 | 12.73 |
| Opacity | 84.15 | 85.52 | 86.32 | 89.00 | 87.10 | 85.42 | 90.76 | 93.07 |
| Pore Size Dist. (MIN) | 7.1 | 6.5 | 6.5 | 7.6 | 8.0 | 6.7 | 6.7 | 6.4 |
| Pore Size | 35.0 | 32.5 | 31.1 | 43.5 | 47.8 | 37.2 | 29.7 | 31.5 |

TABLE 3-continued

| | Sample | | | | | | | |
|---|---|---|---|---|---|---|---|---|
| | A | B | C | D | E | F | G | H |
| Dist. (MAX) | | | | | | | | |
| Pore Size Dist. (MEAN) | 11.5 | 10.7 | 10.0 | 11.3 | 13.4 | 11.2 | 10.9 | 10.0 |

Comparing Tables 2 and 3 demonstrates that thermal bonding can be used to tailor the Frazier porosity (i.e., maintain or increase) of the spunlaced fabric to a level well suited for filtration applications such as vacuum cleaner bags (i.e., 10–20 ft$^3$/ft$^2$/min).

EXAMPLE 3

In this example, the effect of the level of thermal bonding is demonstrated. Samples 1–4 from Example 1 were thermally bonded at (1) 48 psi steam pressure at 100 ft/min and (2) 54 psi steam pressure at 100 ft/min. The physical properties of the resulting thermally bonded, spunlaced nonwoven fabrics are set forth in Table 4 below.

TABLE 4

| | Sample | | | | | | | |
|---|---|---|---|---|---|---|---|---|
| | 48 psi | 54 psi | 48 psi | 54 psi | 48 psi | 54 psi | 48 psi | 54 psi |
| | 1 | | 2 | | 3 | | 4 | |
| Basis Weight | 2.9 | — | 3.0 | 2.9 | 2.7 | 2.8 | 2.8 | 2.6 |
| Thickness (mils) | 15.4 | — | 14.6 | 13.8 | 13.3 | 12.8 | 16.1 | 14.7 |
| Frazier Porosity | 10.7 | — | 9.2 | 11.3 | 5.5 | 11.6 | 9.8 | 12.5 |
| Opacity | 94.3 | — | 92.9 | 88.1 | 91.3 | 84.1 | 94.1 | 89.8 |

When compared with Table 1 for physical properties while unbonded and at 58 psi steam pressure at 100 ft/min, it is clear that increasing the bonding level (i.e., temperature) will increase the Frazier porosity of the resulting thermally bonded, spunlaced nonwoven fabric according to the invention (samples 1–5).

Table 5 compares physical properties of a representative thermally bonded sample of the invention (sample A) with ranges of typical physical properties for samples of commercially available prior art filtration media.

TABLE 5

| | Sample A | "HY-SURF" | MELT-BLOWN | "TYVEK" | Paper Vacuum Cleaner Bag |
|---|---|---|---|---|---|
| Frazier Porosity | 18.7 | 8–18 | 30–40 | <0.1 | 24 |
| Pore Size Dist. (MIN) | 7.1 | 5–7 | 8–9 | 3 | 10 |
| Pore Size Dist. (MAX) | 35.0 | 19–23 | 30–40 | 9–12 | 69 |
| Pore Size Dist. (MEAN) | 11.5 | 9–12 | 14–17 | 4–6 | 19 |
| Mullen Burst | 91.8 | 40 | 10–15 | 90–120 | 30 |

This comparative table illustrates the ability of the inventive sample to act as a suitable filtration media for such things as vacuum cleaner bags.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

We claim:

1. A process for making a spunlaced nonwoven fabric comprising the steps of:
   (a) positioning a web of staple fibers against an unbonded flash spun web on a supporting screen to form a composite web structure; and
   (b) hydraulically needling the staple fiber side of the supported composite web structure such that the staple fibers penetrate the flash spun web and are embedded into and entangled with the unbonded flash spun web.

2. The process according to claim 1 wherein hydraulic needling is performed using water jets operating at a pressure of between 200 and 3,000 psi.

3. The process according to claim 1 wherein the flash spun web is comprised of polyolefin plexifilaments.

4. The process according to claim 3 wherein the polyolefin is selected from the group consisting of polyethylene and polypropylene.

5. The process according to claim 1 wherein the staple fibers are selected from the group consisting of polyester, nylon, acrylics, aramids, woodpulp and mixtures thereof.

6. An unbonded composite nonwoven fabric produced by the process of claim 1 wherein the fabric has a Frazier porosity of at least 4 ft$^3$/ft$^2$/min.

7. The process of claim 1 further comprising the step of thermally bonding the spunlaced nonwoven fabric to maintain or increase the permeability of the fabric.

8. The process of claim 7 wherein the fabric has a Frazier porosity of between 10 and 40 ft$^3$/ft$^2$/min.

9. A thermally bonded, spunlaced nonwoven fabric produced by the process of claim 7 wherein the fabric has a Frazier porosity of at least 4 ft$^3$/ft$^2$/min.

10. An unbonded, spunlaced nonwoven fabric comprised of an unbonded flash spun web having staple fibers embedded into and entangled therewith, the fabric having a Frazier porosity of at least 4 ft$^3$/ft$^2$/min.

11. A thermally bonded, spunlaced nonwoven fabric comprised of an unbonded flash spun web having staple fibers embedded into and entangled therewith, the fabric having a Frazier porosity of at least 4 ft$^3$/ft$^2$/min.

12. The thermally bonded, spunlaced nonwoven fabric of claim 11 wherein the fabric has a Frazier porosity of between 10 and 40 ft$^3$/ft$^2$/min.

13. A downproof and featherproof liner made from the unbonded, spunlaced nonwoven fabric of claim 10.

14. The unbonded, spunlaced nonwoven fabric of claim 10 wherein the fabric is used as a liner for pillows, sleeping bags, comforters or garments.

15. A filtration media made from the thermally bonded, spunlaced nonwoven fabric of claim 11.

16. A vacuum cleaner bag made from the thermally bonded, spunlaced nonwoven fabric of claim 11.

* * * * *